United States Patent
Kossakovski et al.

(10) Patent No.: US 10,370,020 B2
(45) Date of Patent: Aug. 6, 2019

(54) HEATING AND COOLING DEVICE FOR HANDLES, ESPECIALLY OF STEERING MECHANISM

(71) Applicant: GENTHERM AUTOMOTIVE SYSTEMS (CHINA) LTD., Langfang, Hebei (CN)

(72) Inventors: Dmitri Kossakovski, South Pasadena, CA (US); Jonathan Yu Zhang, Tianjin (CN); Fred Fufei Zhang, Langfang (CN); Melinda Meijing Hu, Langfang (CN)

(73) Assignee: GENTHERM AUTOMOTIVE SYSTEMS (CHINA) LTD., Langfang, Hebei (CN)

( * ) Notice: Subject to any disclaimer, the term of this patent is extended or adjusted under 35 U.S.C. 154(b) by 127 days.

(21) Appl. No.: 15/129,643

(22) PCT Filed: Mar. 31, 2015

(86) PCT No.: PCT/CN2015/075449
§ 371 (c)(1),
(2) Date: Sep. 27, 2016

(87) PCT Pub. No.: WO2015/149674
PCT Pub. Date: Oct. 8, 2015

(65) Prior Publication Data
US 2017/0174246 A1    Jun. 22, 2017

Related U.S. Application Data

(63) Continuation-in-part of application No. PCT/CN2014/088910, filed on Oct. 20, 2014, and a
(Continued)

(51) Int. Cl.
*F25B 21/02* (2006.01)
*F24F 7/04* (2006.01)
(Continued)

(52) U.S. Cl.
CPC ......... *B62D 1/065* (2013.01); *B60H 1/00292* (2013.01); *B60H 1/00478* (2013.01); *B60H 2001/003* (2013.01)

(58) Field of Classification Search
CPC ...... B60H 1/00292; B62D 1/065; B62D 1/06; B62D 1/10; B62D 1/16; F25B 21/02;
(Continued)

(56) References Cited

U.S. PATENT DOCUMENTS

| 2,835,777 A | 5/1958 | Gates et al. | |
| 3,149,501 A * | 9/1964 | Keir | B62D 1/065 137/340 |

(Continued)

FOREIGN PATENT DOCUMENTS

| CN | 1519160 A | 8/2004 |
| CN | 1822977 A | 8/2006 |

(Continued)

OTHER PUBLICATIONS

International Search Report and Written Opinion from the State Intellectual Property Office of the People's Republic of China for Application No. PCT/CN2015/075449, dated Jun. 23, 2015.
(Continued)

*Primary Examiner* — Frantz F Jules
*Assistant Examiner* — Erik Mendoza-Wilkenfel
(74) *Attorney, Agent, or Firm* — The Dobrusin Law Firm, P.C.; Daniel P. Aleksynas (57) ABSTRACT

A climate control device (15) for influencing at least one climatic parameter of a handle (5) of a steering device (2), has an air moving device (21) for providing a stream of air, a handle distributor (26) for distributing a stream of air within at least a part of the handle, an air guidance device (22) for guiding air between the air moving device and the distributor. The air moving device (21) can be or is mounted
(Continued)

to an area remaining static in relation to an adjustment movement of the steering device (2). The handle distributor (26) can be or is mounted to an area moving in relation to the static area when the steering device (2) is subject to an adjustment movement. The climate control device (15) is provided with a connecting device (30) allowing the air moving device (21) and the handle distributor (26) to move in relation to each other.

18 Claims, 4 Drawing Sheets

Related U.S. Application Data continuation-in-part of application No. PCT/CN2014/074450, filed on Mar. 31, 2014.

(60) Provisional application No. 62/076,107, filed on Nov. 6, 2014.

(51) Int. Cl.
 F24F 13/02 (2006.01)
 B62D 1/06 (2006.01)
 B60H 1/00 (2006.01)

(58) Field of Classification Search
 CPC ......... F25B 21/04; F24F 7/04; F24F 13/0236; F24F 13/0281; F24F 2013/0616; B60R 2011/001; F16K 11/0853; F16K 11/0856; Y10T 137/86743; Y10T 137/86751; Y10T 137/86863; Y10T 137/86871; Y10T 137/8782
 See application file for complete search history.

(56) References Cited

U.S. PATENT DOCUMENTS

| | | | |
|---|---|---|---|
| 3,876,844 | A | 4/1975 | Scherenberg |
| 4,640,340 | A | 2/1987 | Noda et al. |
| 4,993,281 | A | 2/1991 | Miller |
| 5,850,741 | A | 12/1998 | Feher |
| 5,948,347 | A | 9/1999 | van Jaarsveld et al. |
| 6,007,420 | A | 12/1999 | Harm et al. |
| 6,298,750 | B1 | 10/2001 | Kerner et al. |
| 6,481,312 | B1 | 11/2002 | Wissel |
| 6,533,184 | B1 | 3/2003 | Kim |
| D559,158 | S | 1/2008 | Garcia |
| 7,908,941 | B2 | 3/2011 | Menaldo et al. |
| 9,815,488 | B2 | 11/2017 | Lofy |
| 2002/0060722 | A1 | 5/2002 | Axtell et al. |
| 2002/0166407 | A1 | 11/2002 | Germuth-Loffler et al. |
| 2004/0168540 | A1 | 9/2004 | Weiss |
| 2006/0033628 | A1 | 2/2006 | Duval |
| 2006/0121843 | A1 | 6/2006 | Koval |
| 2007/0101728 | A1 | 5/2007 | Ruetz |
| 2007/0234742 | A1* | 10/2007 | Aoki ................. B60H 1/00285 62/3.3 |
| 2009/0114368 | A1 | 5/2009 | Niwa et al. |
| 2010/0288073 | A1 | 11/2010 | Shin et al. |
| 2011/0272131 | A1 | 11/2011 | Mikat |
| 2013/0180354 | A1* | 7/2013 | Maranville ............ B62D 1/065 74/552 |
| 2015/0197135 | A1 | 7/2015 | Chen |
| 2015/0329137 | A1* | 11/2015 | Onica .................... B62D 1/065 165/59 |
| 2017/0174247 | A1 | 6/2017 | Kossakovsk et al. |

FOREIGN PATENT DOCUMENTS

| | | |
|---|---|---|
| CN | 102815183 A | 12/2012 |
| CN | 203111289 U | 7/2013 |
| CN | 203111289 U | 8/2013 |
| DE | 7149043 U | 4/1972 |
| DE | 102009037670 A1 | 2/2011 |
| EP | 1783029 A1 | 5/2007 |
| EP | 2065234 A1 | 6/2009 |
| EP | 2065290 A1 | 6/2009 |
| FR | 2922178 A1 | 4/2009 |
| GB | 2362203 A | 11/2001 |
| JP | S58-170664 A | 10/1983 |
| JP | S62-128879 A | 6/1987 |
| JP | H02-007070 U | 1/1990 |
| JP | H02-120216 U | 9/1990 |
| JP | H02-293255 A | 12/1990 |
| JP | H04-090966 A | 3/1992 |
| JP | 08239048 A * | 9/1996 |
| JP | H09-141233 A | 6/1997 |
| JP | H10-230857 A | 9/1998 |
| JP | 11245824 A * | 9/1999 |
| JP | 2004-142615 A | 5/2004 |
| JP | 2006-177634 A | 7/2006 |
| JP | 2006176037 A | 7/2006 |
| JP | 2011-020648 A | 2/2011 |
| JP | 2012-063050 A | 3/2012 |
| WO | 03/047942 A1 | 6/2003 |

OTHER PUBLICATIONS

Search Report by Registered Searching Organization (General Industrial Property Cooperation Center) for Publication No. JP 2017/509536 dated Sep. 11, 2017 (Japanese equivalent of present application).

Notification of Refusal from the Japanese Patent Office for Publication No. JP2017/509536 drafted on Sep. 19, 2017 (Japanese equivalent of present application).

Notification of Refusal from the Korean Patent Office for Publication No. KR20160140814A dated Feb. 1, 2018 (Korean equivalent of present application).

Notification of Refusal from the Korean Patent Office for Publication No. KR20160140815A dated Feb. 1, 2018 (Korean equivalent of present application).

Potentially Related U.S. Appl. No. 15/129,649 published as US2017/0174247A1, filed Sep. 27, 2016.

* cited by examiner

HEATING AND COOLING DEVICE FOR HANDLES, ESPECIALLY OF STEERING MECHANISM

FIELD

An object according to the present teachings are a heating and cooling device for handles and steering mechanisms for influencing at least one climatic parameter. The present teachings, for example, can be used in the heating, cooling, or ventilation of handles of vehicle doors, steering wheels, or control sticks.

BACKGROUND

Vehicles currently include additional climate devices to provide comfort to occupants. Many steering wheels include heaters that heat all or a portion of a steering wheel on cold days so that the occupant's hands are kept warm. Attempts have been made to provide both heating and cooling to a steering wheel so that the steering wheel can be cooled on hot days. However, due to the small packaging space available it is difficult to place a heating and cooling system within a steering wheel and/or related assembly that provides heating and/or cooling to the occupant. Due to this rather small packing space attempts have been made to connect to the onboard heating and cooling system of the vehicle and channeling the conditioned fluid through the steering wheel. However, it is challenging to independently control the temperature of the vehicle and the steering wheel due to the common connection with the vehicle's ventilation system. Other attempts have been made to miniaturize components to fit within the provided packaging space, but these systems typically suffer from poor performance due to the small scale of the components. Finally, providing temperature control to one or more other steering devices has been increasingly difficult due to the relative movement of the steering devices relative to other devices and due to the smaller packing space then in a steering wheel. One example of a system to cool a steering wheel is found in U.S. Pat. No. 5,850,741 to cool a steering wheel by integrating heat pipes into the steering wheel the teachings of which are incorporated by reference herein in its entirety for all purposes. As the steering wheel has to meet a number of conditions, like crash-safety, stability, good grip for hands of different size or strength, it is difficult to put such a system into practice. Other examples, of attempts to condition a steering wheel are found in U.S. Pat. Nos. 6,007,420; 6,298,750; 6,533,184; and 7,908,941 the teachings of which are expressly incorporated by reference herein in their entirety for all purposes.

What is needed is a device that provides fluid to a movable component. What is needed is climate control device that has components located in a static component and components located within a movable component and a device for fluidly connecting the movable component and the static component without the movement of the movable component inhibiting fluid movement. It would be desirable to have a device that fluidly connects a movable component to a static component and eliminates fluid lines that move with and relative to the movable component.

SUMMARY

With this as background, a technical concept as is suggested herein is a climate control device for influencing at least one climatic parameter of a handle of a steering device, the climate control device having an air moving device or providing a stream of air; a handle distributor for distributing a stream of air within at least a part of the handle; an air guidance device for guiding air between the air moving device and the distributor, wherein the air moving device can be or is mounted to an area remaining static in relation to an adjustment movement of the steering device; the handle distributor can be or is mounted to an area moving in relation to the static area, when the steering device is subject to an adjustment movement and; the climate control device is provided with a connecting device, allowing the air moving device and the handle distributor to move in relation to each other. The present teachings provide a climate control device (15) comprising: (a) one or more connecting devices (30, 60, 134) located between and fluidly connecting a static component (110) with a movable component (2), the connecting device includes: (i) a static part (62) and (ii) a movable part (64) that are fluidly connected together and create one or more channels (33, 34, 37, 37', 72) each having an inlet from the static component (110) to the movable component (2); (b) one or more air movers located within the static component (110) and being in fluid communication with the movable component (2) through the one or more connecting devices; and wherein the movable part of the one or more connecting devices moves with the movable component so that each of the inlets have a static relationship with the movable component as the movable component is moved.

The present teachings herein provide a handle, vehicle or steering mechanism, equipped with at least one device according to any of the teachings herein.

The teachings relate to a device for influencing at least one climatic parameter. If the device for influencing a zone to be gripped is provided, then surfaces touched by the user, especially handles, can be suitably temperature-controlled, especially steering wheels, door handles, steps, operating handles of machines, etc. The surfaces touched may be controlled by circulating a fluid under the surface so that temperature is removed through conduction, circulating a fluid over the surface so that temperature is removed through convection, or both.

If the device has or is a heating, ventilation or cooling device, then, depending on the requirement, the temperature, the humidity or the air composition at the handle can be adjusted.

In addition, the teachings relate to a handle, a vehicle, or a steering device. If these are equipped with a device described above, this improves its capacity for use under climatically unfavorable conditions.

The present teachings provide a device that provides fluid to a movable component. The present teachings provide a climate control device that has components located in a static component and components located within a movable component and the device for fluidly connecting the movable component and the static component without the movement of the movable component inhibiting fluid movement The present teachings provide a device that fluidly connects a movable component to a static component and eliminates fluid lines that move with and relative to the movable component.

Additional advantageous embodiments can be gleaned from the additional claims and the specification that follows.

The present teachings especially relates to a climate control device 15 for influencing at least one climatic parameter of a handle 5 of a steering device 2, the climate control device 15 having an air moving device 21 for providing a stream of air; a handle distributor 26 for distributing a stream of air within at least a part of the handle 5; an air guidance device 22 for guiding air between the air moving device 21 and the distributor 26.

The teachings herein provide: the air moving device 21 that can be or is mounted to an area remaining static in relation to an adjustment movement of the steering device 2; the handle distributor 26 can be or is mounted to an area moving in relation to the static area, when the steering device 2 is subject to an adjustment movement and the climate control device 15 is provided with a connecting device 30, allowing the air moving device 21 and the handle distributor 26 to move in relation to each other.

This allows e. g. rotation and ventilation of a handle without integration of voluminous parts into the handle. The movable component (e.g., handle, steering device, or both) are free of an air mover, a peltier device, an air conditioning module, or a combination thereof.

It is further suggested that the connecting device 30 allows a rotation of the handle device 26 of at least about 180°, preferably at least about 270°, or even more preferably at least about 360° around a pivot pole 3 of the steering device 2. That e. g. can be reached by providing an interface 40 that allows a shifting of at least two air guidance components relative to each other. For that purpose it is further suggested that the connecting device 30 is provided with ring-like connector channel 37 arranged concentrically in relation toward an axis of the pivot pole 3.

The climate control device 15 is provided with at least two interfaces 40, 40' to create two air paths for allowing an exchange of at least two air streams between a handle distributor 26 and at least one connector device 30, at least a first air stream being directed toward the handle distributor 26 and at least a second air stream being directed away from the handle distributor 26. This allows efficient temperature control without blowing exhaust air toward a user.

It can be preferred that the climate control device 15 is provided with at least one thermoelectric device, representing a temperature-control device 17, at least a first air path is provided for moving a first air stream along a first side of the temperature-control device 17, and at least a second air path is provided to moving a second air stream along a second side of the temperature-control device 17, the first side and the second side having a different temperature during at least one mode of operation.

This allows efficient distribution within the handle distributor simultaneously with a simple operation of a thermal device.

A handle, vehicle, or steering mechanism, equipped with at least one climate control device 15 provides good thermal comfort, while ensuring safety operation and compact packaging.

BRIEF DESCRIPTION

In what follows, the particulars of the teachings are explained. These embodiments should make the teachings understandable. However, they are of only an exemplary nature. Naturally, within the framework of the teachings defined by the independent claims, certain individual or multiple features described can be left out, altered or supplemented. Also, the features of differing embodiment forms could be combined with each other. What is decisive is that the concept of the teachings is implemented in its essence. If one feature is to be implemented at least partially, then it includes this feature being implemented fully also, or being essentially implemented in full. "Essentially" especially means that the implementation permits the desired feature to be attained to a perceptible degree. This can especially mean that a corresponding feature is attained at least by 50%, 90%, 95% or 99%. If a minimum amount is indicated, then naturally more than this minimum amount can also be used. If the number of a component is indicated by at least one or by indefinite article, then this especially includes embodiment forms also with two, three or some other plurality of components. What is described for one object can also be applied for the preponderant part of the totality of all other objects identical in nature. If nothing otherwise is indicated, intervals include their end points. In what follows, reference is made to:

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Figure 1:
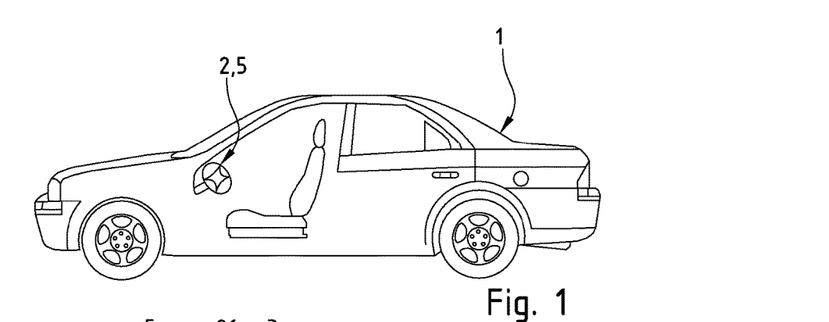
FIG. 1 illustrates a vehicle 1 with a heated and cooled steering device in a partial longitudinal section.

The present teachings claim priority to U.S. Provisional Application Ser. No. 62/076,107, dated Nov. 6, 2014; International Patent Application No. PCT/CN2014/074450, dates Oct. 20, 2014; and International Patent Application No. PCT/CN2014/074450, file don Mar. 31, 2014 the contents of which are expressly incorporated by reference herein in their eternity for all purposes. The teachings related especially to a vehicle 1 as per FIG. 1. A vehicle means a device for transport of persons and/or freight, such as vehicles on land, water, railways and in the air, especially aircraft, ships and automotive vehicles.

The present teachings relate to providing conditioning to one or more movable components. The conditioning may function to remove heat, remove humidity, apply heat, create turbulence, or a combination thereof in and/or around a movable component. The conditioning may provide comfort to an occupant. The conditioning may remove air and/or moisture from an occupant. The conditioning may be provided to an occupant and moist and/or heated air may be removed from the occupant. The conditioning may heat and/or cool through convection (i.e., moving a fluid over an outside of an occupant contact area), through conduction (i.e., moving a fluid through an inside of an occupant contact area), or a combination of both. The conditioning may be provided to an occupant contact location, a piece of equipment that is movable, or both. The movable component as taught herein may be a component that is longitudinally movable, rotationally movable, laterally movable, or a combination thereof. A steering wheel is one preferred component. The one or more movable components may move with, along, or relative to one or more stationary components. The one or more movable components may be any of the steering devices discussed herein, a shifter, or both. The one or more movable components may be in connection with a connecting device.

The one or more connecting devices may function to connect a stationary component to a movable component. The one or more connecting devices may function to allow a fluid to move from a stationary component to a movable component while preventing fluid channels, fluid lines, air guidance devices, supply lines, or a combination thereof (hereinafter all of which are referred to as air guidance devices) form bending, kinking, breaking, being rotated, being stretched, or a combination thereof. The one or more connecting devices may function to allow the one or more air guidance devices and preferably a plurality of air guidance devices to remain static relative to the movable component while the movable component rotates and/or moves. The connecting devices may function to allow relative movement of some of the air guide devices relative to a stationary component while holding the air guidance devices static relative to the movable component. The connecting device may have a fluid channel that extends therethrough and connects air guidance devices on the static component with air guidance devices on the movable component. The connecting device may allow fluid to pass between a static component and a movable component without any air guidance devices (e.g., lines). The connecting device may have one or more chambers that receive fluid (i.e., connector channels). The connecting device may have one or more fluid paths so that fluid extends from a static component to a movable component. The connecting device may provide one or more sealed chambers that allow fluid to pass between air guidance devices without the air guidance devices being directly subjected to movement of the movable component. The one or more connecting one or more dividing walls, one or more end walls, or both.

The one or more dividing walls may function to separate one or more channels. The one or more dividing walls may function to create one or more discrete channels. The one or more dividing walls may be an internal wall. The one or more dividing walls may include one or more through holes that extend therethrough. The one or more dividing walls may extend longitudinally, radially, or both. The one or more dividing walls may be located proximate to and/or be located within one or more end walls.

The one or more end walls may function to seal the connecting device. The one or more end walls may function to connect to one or more air guidance devices. The one or more end walls may function to create ends of a channel. The one or more end walls may be an external wall. The one or more end walls may be part of the static part, the movable parts, or both. The connecting devices may include one or more movable parts and one or more static parts that form one or more connector channels there between.

The one or more movable parts may function to move with a movable component. The one or more movable parts may function to move relative to a static part, a static component, or both. The one or more movable parts may function to form a static connection with one or more air guidance devices located in the movable component. The one or more movable parts may allow for rotational movement, longitudinal movement, lateral movement, or a combination thereof without loss of fluid movement. The one or more movable parts may have one or more surfaces that contact a static part, contact one or more bearings, contact one or more seals, form a bearing surface, or a combination thereof. The one or more movable parts may seal a static part, be sealed by a static part, or a combination of both. The one or more movable parts may form one or more surfaces that enclose a chamber and/or channel (e.g., supply channels through channels, and/or connector channels as discussed herein). The one or more movable parts may be generally cylindrical, square, rectangular, round, circular, toroidally shaped, or a combination thereof. The one or more movable parts may longitudinally slide along a static part and one or more channels may extend between the static part and movable part. The one or more channels may be in a central location of the static part and the movable part may move so that the movable part is always is fluid communication with the one or more channels. The one or more movable parts may extend fully or partially around an outside of a static part. The one or more movable parts may create all or a portion of a channel (e.g., a supply channel, a collector channel, a connector channel, or a combination thereof). The one or more movable parts may extend into a static part. The one or more movable parts may receive a portion of a static part to form a seal. The one or more movable parts may be separated by one or more seals (e.g., a gasket, a rubber piece, an "O" ring, or a combination thereof). The one or more movable parts may include one or more air inlets, one or more air outlets, or both. The one or more movable parts may include 2 or more, 3 or more, 4 or more air inlets. The one or more movable parts may include 2 or more, 3 or more, or 4 or more air outlets. The one or more movable parts may include a plurality of air inlets, a plurality of air outlets, or both. The air inlets, the air outlets, or both may be connected to air guidance devices. The air inlets, the air outlets or both may be in communication with a supply channel in the connecting device. The supply channel may be in fluid communication between the movable part and the static part. The supply channel may extend substantially from a first end to substantially a second end. The supply channel may extend about half of the length of the movable part, the static part, or both. The supply channel may be a through channel that extends from a first side to a second side or from a first half to a second half of the movable part. The through channel may extend through a dividing wall, a portion of the static part, or both. The supply channel may extend substantially the entire length of the movable part, the static part, or both. The one or more movable parts may extend around one or more static parts or vice versa.

The one or more static parts may function to connect to a steering rod and/or steering device and permit for movement of the steering rod and/or steering device relative to a static component. The one or more static parts may function to connect to one or more air guidance devices extending from the static component, the movable component, or both. The one or more static parts may include a shaft aperture to connect to a shaft of a steering device. The one or more static parts may function to create a portion of a supply channel, connector channel, or both. The one or more static parts may create a longitudinal channel, a lateral channel, a radial channel, or a combination thereof. The static part may include one or more channels (e.g., a supply channel and a collector channel). The static part be connected to a static component and a movable component and/or part may move about the static part. The static part may have a movable component that moves within the static part. The static part may form a fixed connection with one or more air guidance devices. The static part may connect with air guidance devices that inlet a fluid, outlet a fluid, or both. The static part may have a series of concentric channels. The static part may have channels that are circular, generally "L" shaped, square, rectangular, or a combination thereof. The static part may have channels that extend parallel to an axis of a movable component. The static part may have channels that extend outward around an axis of the movable component. The one or more static parts may have one or more through channels that extend from a first side of the static part to the second side of the static part. For example, the static part may include a through channel that extend from a first half through a divider to a second half. The static part and movable part may be separated by one or more seals, one or more bearings, one or more gaskets, one or more "O" rings, or a combination thereof. The static part and movable part may be connected together to form a supply portion, a receiver portion, or both.

The one or more supply portions may function to move air towards the steering device. The one or more supply portions may remain static, allow fluid to move between a movable component and a static component, or both. The one or more supply portions may permit air to move through a component without being located within an air guidance device. The one or more supply portions may guide air from an air mover to an occupant contact area, a location proximate to an occupant contact area, or both. The one or more supply portions may supply air and direct air towards the steering device. The one or more supply portions may be part of the static part, the movable part, or both. Preferably, the supply portions are part of the static part. The supply portions may extend into the receiver portion to form a connection between the static part and the movable part. The one or more supply portions may be located proximate to and/or opposite one or more receiver portions. Preferably, the one or more supply portions are fluidly discrete from the one or more supply portions.

The one or more receiver portions may function to waste air, recirculate air to an air mover, remove air from a steering device, or a combination thereof. The one or more receiver portions may connect to a channel in a connecting device that directs air away from an occupant contact area. The one or more receive portions may connect a return circuit to the connecting device so that air and/or a fluid is returned back towards the air mover. The one or more receiver portion may be a portion of the movable part, the static part, or both that receives a portion of the supply portion. Preferably, the receiver portion is part of the movable part and receives a portion of the static part. The receiver portion may receive the supply portion so that a connecting device is formed. The receiver portion may include a supply channel, a portion of a supply channel, or both.

The one or more supply channels may function to provide air from an air mover through the connecting device. The one or more supply channels may be a fluid path through a connecting device. The one or more supply channels may be free of any lines, tubes, hoses, or a combination thereof. The one or more supply channels may replace a line, tube, hose, or a combination thereof. The one or more supply channels may extend towards the occupant contact areas from an air mover. The one or more supply channels may connect to air guidance devices that extend from the air mover towards the occupant contact areas, from the connecting device towards the occupant contact areas, or both. The one or more supply channels may have a portion that is fully enclosed within the static part, the movable part, or both. The one or more supply channels may have a portion that is formed between the static part, the movable part, or both. The one or more supply channels may have a portion that is formed between the static part and the movable part, a portion that is fully formed in the static part, a portion that is fully formed within the movable part, or a combination thereof. Preferably, the connecting device includes a plurality of supply channels. The connecting device may include one or more collector channels.

The one or more collector channels may function to create a fluid pressure within the connecting device. The one or more collector channels may function to permit movement of a fluid to the steering device, away from the steering device, or both. The one or more collector channels may allow air to move without a hose, tube, line, or a combination thereof. The one or more collector channels may be channels that allow air to move away from the steering device, an occupant contact area, or both. The one or more collector channels may be one half of a channel within the connecting device. The one or more collector channels may be a portion located in a static part, a movable part, or both. The connecting device may include a plurality of collector channels. The collector channel may be part of the receive portion, the supply portion, or both. The collector channel may be combined with the supply channel to form a complete channel. Preferably, the supply channel and the collector channel are discrete. More preferably, the supply channel connects to an air inlet and supplies air and the collector channel connects to an air outlet and removes air.

The one or more air outlets may function to direct air from the connecting device towards a steering device, towards an occupant contact area, away from a steering device, away from an occupant contact area, or a combination thereof. The one or more air outlets may be located in the static part, the movable part, or both. The one or more air outlets may be located in the static part and moved relative to the movable part or vice versa. The one or more air outlets may move air away from the connecting device, may receive air into the connecting device, or both. The one or more air outlets may provide air from the connecting device to an occupant contact area, to a steering device, or both. The one or more air outlets may provide air from the connecting device to a waste area, an air mover, or both. The one or more air outlets may each connect to one connector channel.

The one or more connector channels may be the channels located within the connecting device. The one or more connector channels may function to provide air from a static component to a movable component. The one or more connector channels may include and/or be a supply channel, a collector channel, or both. The one or more connector channels may be ring shaped, "L" shaped, square, straight, angled, arcuate, or a combination thereof. The one or more connector channels may have a cross-section that is square, rectangular, triangular, narrow, or a combination thereof. The one or more connector channels may extend between a static component and a movable component so that air flows therebetween. The one or more connector channels may have air flow from an air mover towards an occupant contact area or vice versa.

The interface may function to be a junction between two parts of the connecting device. The interface may function to be a connection region between two or more parts of the connecting device. The interface may function to connect and/or be a connection region between a movable part and a static part of the connecting device. The interface may function form a joint between two or more parts of the connecting device (e.g., a movable part and a static part). The interface may be a location of contact between two or more parts. The interface may be contact locations, seals between parts, or both. The interface may form a connection between two or more parts of the connecting device so that a sealed connecting device is formed. The interface may be points of contact, lines of contact, or both. The interface may be at ends of the connecting device, in a middle of the connecting device, around a periphery of the connecting device, around a plurality of peripheries of the connecting device, or a combination thereof. For example, the connecting device may include a plurality of channels and the interfaces may form a seal so that the plurality of channels are fluidly discrete from each other. The interface may be located proximate to the air guidance devices, may form a seal so that fluid from the air guidance devices does not leak, or both.

The one or more air guidance devices may function to provide an air path from a static component to a movable component. The one or more air guidance devices may function to connect a static component to a connecting device, from a connecting device to a movable component, or both. The one or more air guidance devices may be a tube, hose, line, or a combination thereof. The one or more air guidance devices may be any conduit that transports a fluid between locations. The one or more air guidance devices may be rigid, semi-rigid, preferably flexible, or a combination thereof. The one or more air guidance devices may be rubber, elastic, fiber reinforced, metallic, metallic reinforced, nylon reinforced, stainless steel, or a combination thereof. The one or more air guidance devices may remain static relative to the component which they are located within, connected to, or both. The one or more air guidance devices may guide air from an air mover to a location of interest, from a location of interest to an air mover, or both.

Figures 2, 3, 4:
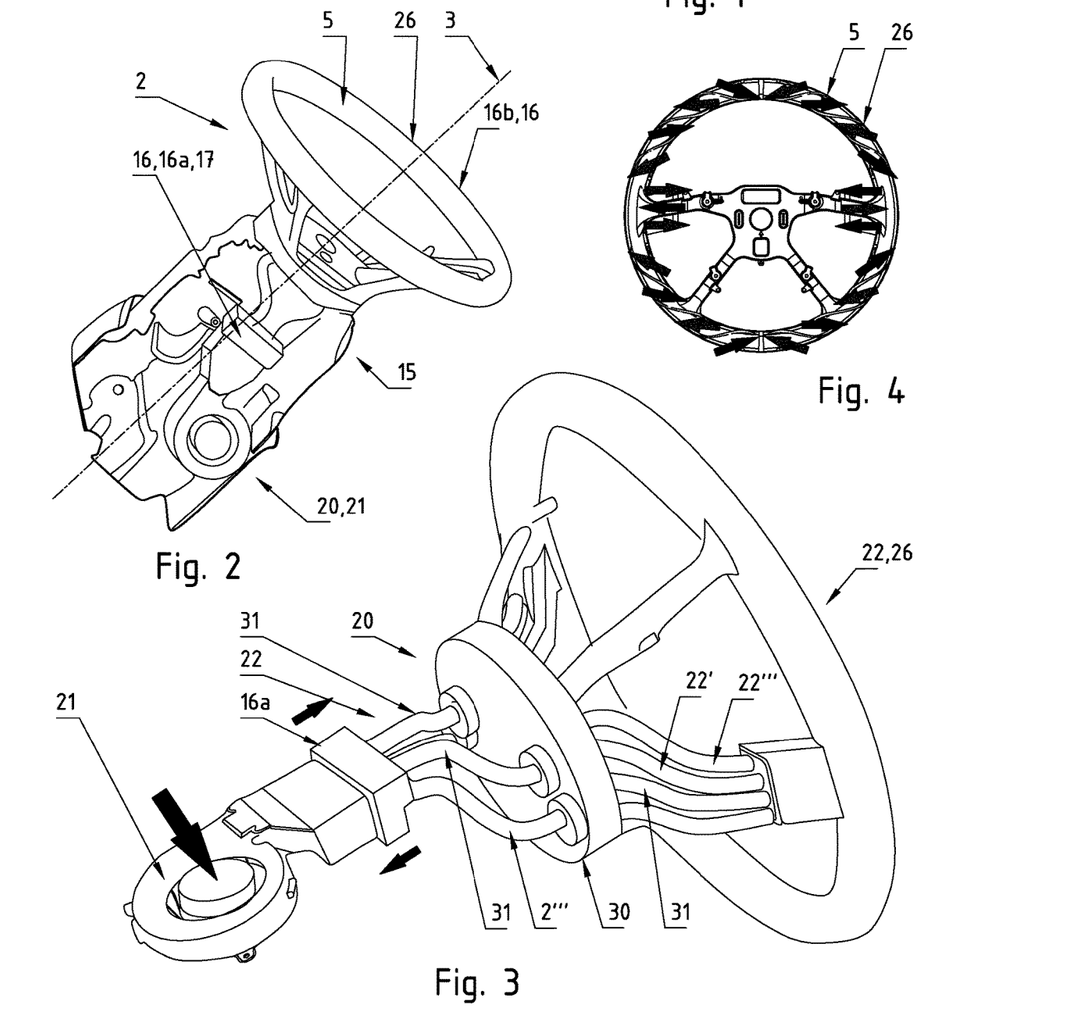
FIG. 2 illustrates a steering device from FIG. 1, in a side view with an air-distribution device under a removed cover.
FIG. 3 is an enlarged side view of the steering device of FIG. 2 with the side covers completely removed.
FIG. 4 is a top view on an open steering wheel of FIGS. 1-3.

The teachings additionally relates to a steering device 2, such as steering wheels of motor vehicles as per FIG. 2, control sticks or aircraft or drag links of motorcycles.

Preferably the at least one control mechanism has a pivot pole 3. Pivot pole means the reference point or the reference axis about which a steering mechanism is moved to generate a steering signal. Examples are a so-called front end for a motorcycle steering bar or the steering wheel cup with a steering wheel, a centering point with a multidimensional-operation control stick or some other reference point with a nonrotary-operating steering system such as slide controls.

Preferably the at least one steering mechanism has at least one handle 5. Handle means a device for grasping and applying adjustment forces, especially for manual adjustment of steering devices, of doors, or for operation of motors. Examples are steering handles on motorcycles or steering wheel rings on steering wheels. Especially suited for this are knobs, rods or annular or arc-shaped round profiles made for example of wood, plastic or metal.

In addition, the teachings also relates to a climate control device 15. Climate control device means an object that is suited to influence an area to be influenced with regard to at least one climatic parameter, for example for heating, ventilation, moisturizing or removal of moisture, and/or cooling.

Preferably at least one climate control device 15 has at least one temperature-control device 17. Temperature-control device means a device which serves for deliberate temperature control of a user or of an object to be heated, especially for raising, maintaining or lowering the temperature, such as heating, cooling or ventilating devices.

In addition, the teachings relates to a heating device 16, which preferably represents the temperature control device 17 or a component part of it. A heating device means a device that provides thermal energy for specific heating of its surroundings, and emits that energy conductively, convectively and/or through thermal radiation to its surroundings. Examples are devices with at least one electrical resistance heater, a heat pump, a radiator, or a heating spiral, with multiples of these components, also of differing types, also possibly being present. It is favorable if a planar heating element 16b is provided in a jacket for heating a handle surface and additionally a Peltier element 16a or a PTC heating module is provided in an air flow for heating an air flow directed to the steering device 2.

Preferably at least one heating device 16 has at least one heating resistor for direct or indirect heating of a handle. Heating resistor implies an ohmic resistance or some other electrical component which converts electrical into thermal energy when current passes through. Examples are a plurality of heating sections made of carbon fibers, PTC heating modules connected in an air flow, layers made of an electrically conducting plastic, metal foils such as those made of aluminum or individual large-area heating sections made of metallic strands, especially in a grip zone of a surface of a handle.

Preferably at least one temperature-control device has at least one cooling device 19 for removal of excess thermal energy, especially through insolation. Cooling device means a device to lower the temperature of a surface to be cooled or an object to be cooled, such as Peltier elements, thermal conduction pipes or ventilation devices such fans. A position at a distance from temperature-controlled zones promotes simple assembly and reduced structural space, for example in the direction of flow immediately behind a fan, especially close to, or in, a pivot pole of the steering mechanism. Fans with integrated Peltier modules are favorable for a modular combination of the fan and cooling device.

Preferably at least one heating or cooling device has at least one ventilation device 20. Ventilation device means a device that can be used for deliberate alteration of the air composition or the air flows in a specific two-dimensional or three-dimensional area.

Preferably at least one ventilation device has at least one air moving device 21. Air moving device means a device for moving of air. Examples are fans, especially a radial fan as or an onboard air conditioner.

Preferably at least one ventilation or air conditioning device has at least one air guidance device 22. Air guidance means a device which can guide air in at least one direction between a zone to be air conditioned and an air feed device or along a zone to be ventilated.

Preferably the at least one ventilation device exhibits at least one handle distributor 26 for ventilation or back-ventilation of a handle. Handle distributor means a device for collecting, distributing and/or directing air within or along the handle, for example, through pipes or gaps which connect one or more attachment or ventilation openings with one another.

Preferably an air guidance device 22 has at least one connecting device 30, to movably connect a ventilation device 20 and a handle distributor 26. A connecting device 30 preferably has a disc-like shape. Preferably its center axis is identical with the pivot pole 3. Preferably an air guidance device 22 is arranged in a plain perpendicular to the pivot pole 3.

A connection device 30 is provided with at least two separate parts 31' and 32', of which at least one is movable relative to the other by sliding or pivoting. One part 31' supplies air, the other part 32' receives that air. Which one is supplying and which one is receiving depends upon the direction of a passing air flow. So in case the air flow is switched in an opposite direction, the parts would have the respective opposite function, too.

Preferably a connecting device 30 has a supply portion 31 for supplying air, which usually corresponds to one of the parts 31' and a receiver portion 32 for receiving air, which usually corresponds to the at least second part 32'. At least one of those portions is movable relative to the other portion, without significant loss of air. So a relative movement between the portions is possible while at the same time essentially the whole supplied air of the supply portion 31 is transferred to the receiver portion 32.

Both parts 31' and 32' share at least one joint interface 40 to exchange air between them. For that purpose, the parts 31' and 32' are at least partly open toward each other along the joint interface 40. If that interface 40 is arranged at least partly along a cylindrical surface concentric to the pivot pole 3, such openings allow a transfer of air from one part 31', 32' to the other substantially perpendicular to the axis of the pivot pole 3.

Figures 5, 6, 7:
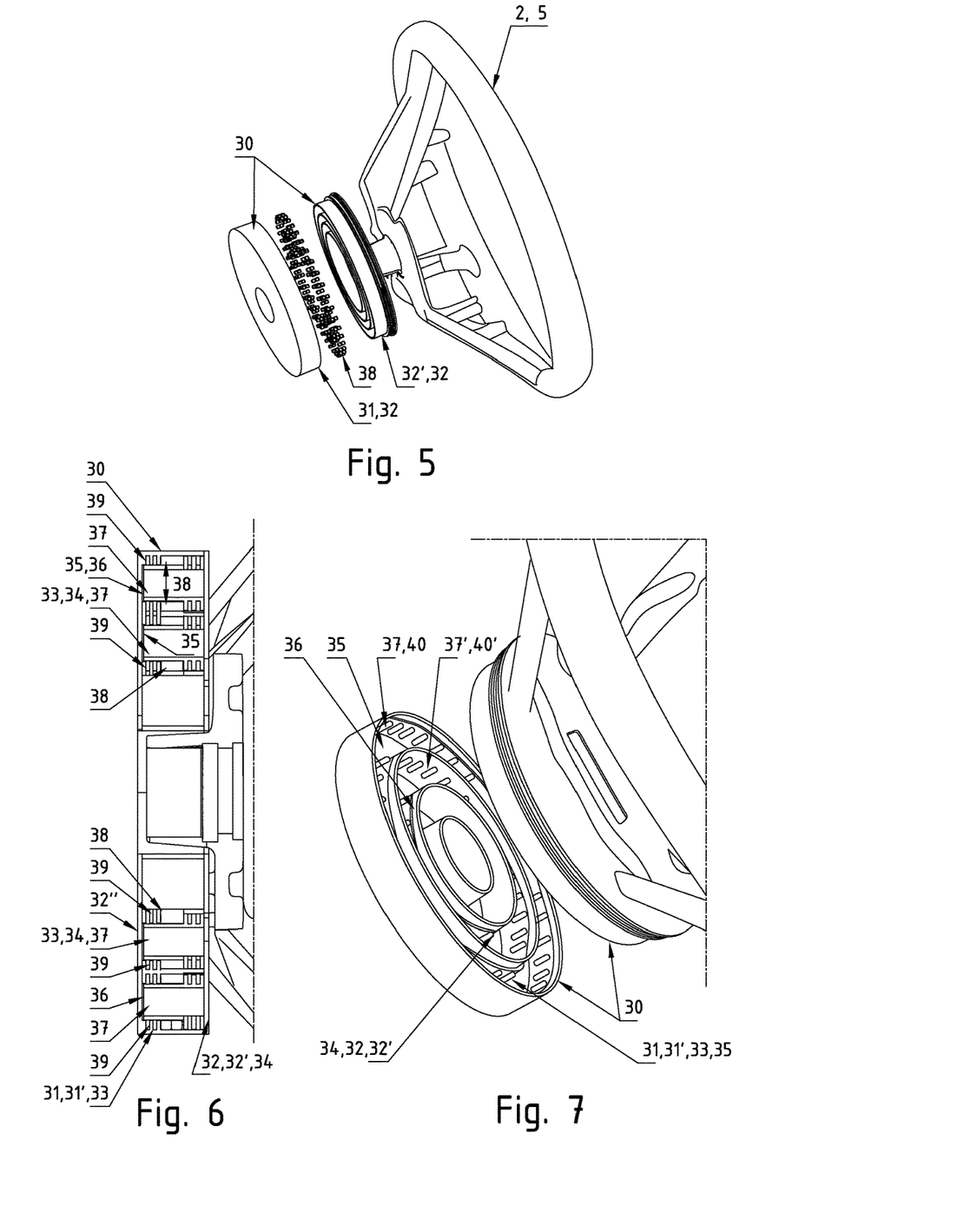
FIG. 5 is a perspective view of an explosion view on an air flow connection device for the steering wheel of FIGS. 1-4.
FIG. 6 is an enlarged cross-section of the air flow connection device of FIG. 5.
FIG. 7 is a perspective view of the air flow connection device of FIGS. 5 and 6 from a different angle.

If that interface 40 is arranged at least partly along a plane perpendicular to the axis of the pivot pole 3, as in FIGS. 5-7, such openings allow a transfer of air from one part 31', 32' to the other by a stream of air, having a direction substantially along the axis of the pivot pole 3. Especially in this case, preferably both parts intermesh with each other, to improve air tightness of their connection. This e. g. can be achieved by inserting them into each other during assembly by movement along the axis of the pivot pole 3.

Preferably at least one supply portion 31 has at least one supply channel 33, to provide air along at least a part of a path of relative movement. It is preferably a circular channel with rectangular or trapezoid cross-section and one open side.

Preferably at least one receiver portion 32 has at least one collector channel 34, to collect air along at least a part of a path of relative movement. At least a part of its cross-section corresponds to at least a part of the cross-section of supply channel 33. It is preferably a circular channel with rectangular or trapezoid cross-section and one open side, which faces toward the open side of the supply channel 33.

Preferably a supply portion 31 and/or a supply channel 33 have an air outlet 35, e. g. represented by one or more openings. It e. g. can be of circular, rectangular or long narrow form. Preferably it is ring-like, with its center arranged on the pivot pole 3 of the steering device 2.

Preferably a receiver portion 32 and/or a collector channel 34 have an air inlet 36, e. g. by one or more openings. The receiver portion 32 and/or the collector channel 34 e. g. can be of circular, rectangular or long narrow form. Preferably the receiver portion 32 and/or the collector channel 34 are ring-like, with a center arranged on the pivot pole 3 of the steering device 2.

In a preferred embodiment a supply channel 33 of a supply portion 31 and a collector channel 34 of a receiver portion 32 are at least part from a common connector portion channel 37. While being slidable or pivotable moveable relative to each other, both parts work together to keep guided air within the common connection channel and do not let air escape from the border between both parts.

To enable a smooth relative movement between portions 31 and 32 at least one rolling element 38 is arranged between at least one border wall of the supply portion 31 and at least one border wall of the receiver portion 32. Preferably a multitude of rolling elements 38 are arranged along the joint border walls of the common connection channel 37, preferably on both of its sides, so on the inner side as well as on the outer side relative to the pivot pole 3.

A rolling element 38 preferably has a ball-like, a cylindric or a cone-shaped form. To save space cylindric rolling elements are preferred. However, seals may be provide a bearing surface to allow for movement.

To prevent an exchange of air between the rolling elements, preferably the connection device 30 is provided with one or more sealing devices 39, e. g. seals or gaskets. Such sealing devices 39 are preferably positioned along or in parallel to the arrangement of the rolling elements (e. g. a bearing).

Preferably a radial ventilator is used as an air moving device 21. The radial ventilator is mounted in a zone, which is static in relation to an adjustment movement of a steering device 2. At the discharge side of the air moving device 21 a temperature control device 17 is provided. The radial ventilator could also be provided within or attached to an air guidance device 22 or further along an air path connected to the air moving device 21. That temperature-control device 17 could be a first heat resistor, e. g. a positive temperature coefficient (PTC) heater, mounted to heat the air stream of the air moving device 21.

Preferably the temperature control device is a thermo-electric device 16a to selectively heat or cool the discharged air.

Preferably the air moving device 21 is connected to one side of the thermoelectric device 16a, to provide an air stream with heating or cooling energy.

Preferably the temperature-control device 17 is connected via two or more tubes or channels and one or more connection devices 30. This creates a multitude of air streams and works as one or more air guidance devices 22 between the temperature-control device 17 and the one or more connection devices 30.

Preferably the one or more air guidance devices 22 are connected with one or more distributor portions 31 and/or supply channels 33 or one or more connection devices 30. The stream of air within the air guidance device 22 is perpendicular to the direction within the supply channel 33.

If there are two or more air guidance devices connected with the same supply channel 33, their connection points are preferably separated from each other to improve a homogenous air distribution within supply channel 33. If that supply channel has a ring-like form, the connection points preferably are separated a number of degrees from each other, which essentially corresponds to about 360° divided by the number of connection points or the number of connected air guidance devices 22. So in the present example the two connection points are separated roughly by about 180° from each other.

The supply channel 33 of the supply portion 31 in the present example also forms the collector channel 34 of the receiver portion 32. So in this section the resulting air stream forms a ring-like hollow room representing a common connector channel 37. It allows an air movement along the axis of the pivot pole 3 as well as an air movement around the pivot pole 3.

A receiver portion 32 and/or a collector channel 34 is preferably connected via one or more tubes, representing further air guidance devices 22', 22''' with a handle distributor 26 within the steering device 2 and/or a handle 5.

To allow a homogenous distribution of air within a handle 5, the stream of air can be split up via a multitude of air guidance devices 22'. Preferably their number is similar or even higher than the number of air guidance devices 22 between the air moving device 21 and the connecting device 30. Preferably their number is twice as high to allow a distribution of air in more than one direction along a handle 5.

Preferably a climate control device 15 is provided with more than one connecting device 30. Preferably a climate control device 15 and/or a connecting device 30 could additionally or alternatively be provided with more than one supply portion 31 and/or receiver portion 32. This allows to increase the volume of the resulting air supply by a plurality of parallel air streams.

Sometimes it is also favorable to have a climate control device 15 and/or a connecting device 30 provided with means to allow two or more air streams simultaneously, especially in opposing directions. Then one air stream could be directed from the air moving device 21 toward a handle 5 and distributed within a handle distributor 26. At the same time, a backward stream could be guided from the handle distributor 26 back toward a parallel second connector device, a second interface 40' or a second connector channel 37'. From there the air stream could be guided via a further guidance device 22''' toward a second side of the thermoelectric device 16a. Thus it could serve as exhaust air stream removing unwanted exhaust heat or exhaust cold from the thermoelectric device 16a. Its discharge could then take place, e. g. via a discharge tube, where it does not disturb, e. g. in the foot area of a cabin or outside of the vehicle 1.

Figure 8:
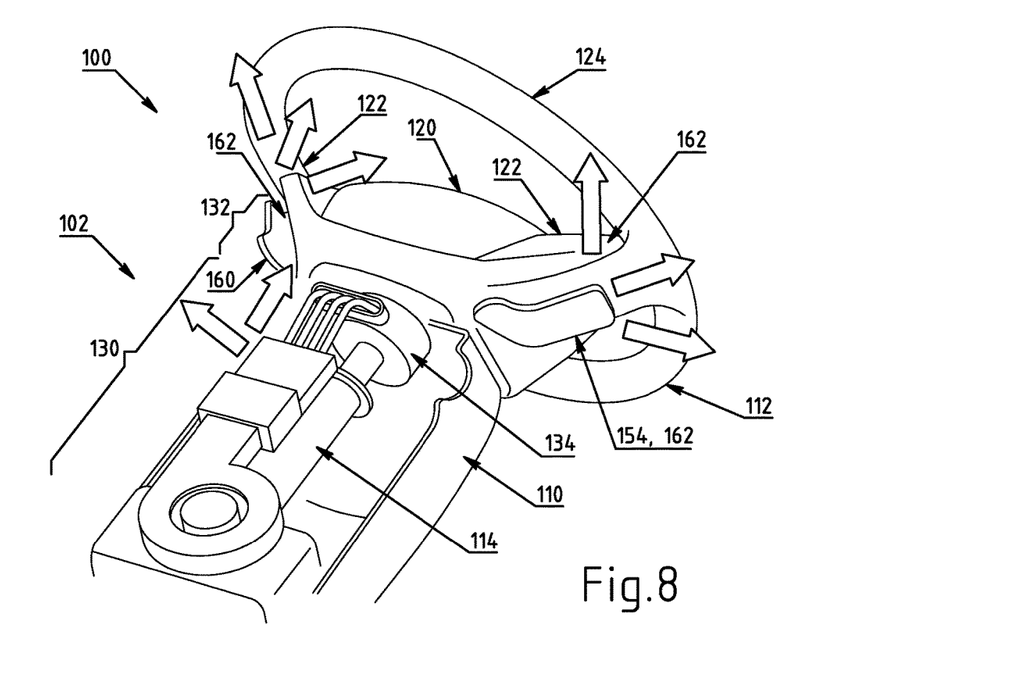
FIG. 8 illustrates another heated and cooled steering device in a partial longitudinal section.

FIG. 8 illustrates steering device 100 having another climate controlled device 102 according to the present teachings. The steering device 100 includes a steering column 110 and a steering wheel 112. The steering column 110 includes a steering shaft 114. The steering wheel 112 is fixed for rotation with the steering shaft 114 in a conventional manner. The steering wheel 112 includes a central hub 120, spokes 122, and a grip piece or rim 124 connected to the central hub 120 via the spokes 122. A number of spokes 122 can vary. For present purposes, two spokes 122 are shown. The rim 124 is grasped by hands of a vehicle driver, and used to manipulate the steering device 100.

The climate controlled device 102 includes an air conditioning module 130, an air distribution module 132, and a connecting device 134. The air conditioning module 130 is fixed to and housed within the steering column 110. The air distribution module 132 is fixed to the steering wheel 112. The connecting device 134 is fixed to the steering shaft 114 and fluidly couples the air conditioning module 130 and the air distribution module 134.

The air conditioning module 130 provides conditioned air to the air distribution module 132. The air conditioning module 130 includes a ventilation device 140, a temperature control device 142, and air guidance device 144. The ventilation device 140 draws in air through an inlet and forces the air through the temperature control device 142 and air guidance device 144 as indicated by the arrows in FIG. 9. The temperature control device 142 heats or cools the air to a desired temperature. For illustration, the temperature control device 142 as shown includes a Peltier device that exhausts waste air as shown by the arrows in FIGS. 8-9. The air guidance device 144 distributes the air to inlets of the connecting device 134. The air guidance device 144 includes channels formed by tubes or other structure integrated with the steering column 110. For illustration, the air guidance device 144 includes four tubes. A number of channels or tubes can vary based on a number of locations where conditioned air is desired, and a valve configuration of the connecting device 134. For example, there may be one, two, three, four or more channels or tubes. The air conditioning module 130 may incorporate one or more features of the steering device 2, and more specifically the climate control device 15, temperature control device 17, and ventilation device 20 described above. Therefore, for brevity the air conditioning module 130 will not be described in more detail.

Figure 9:
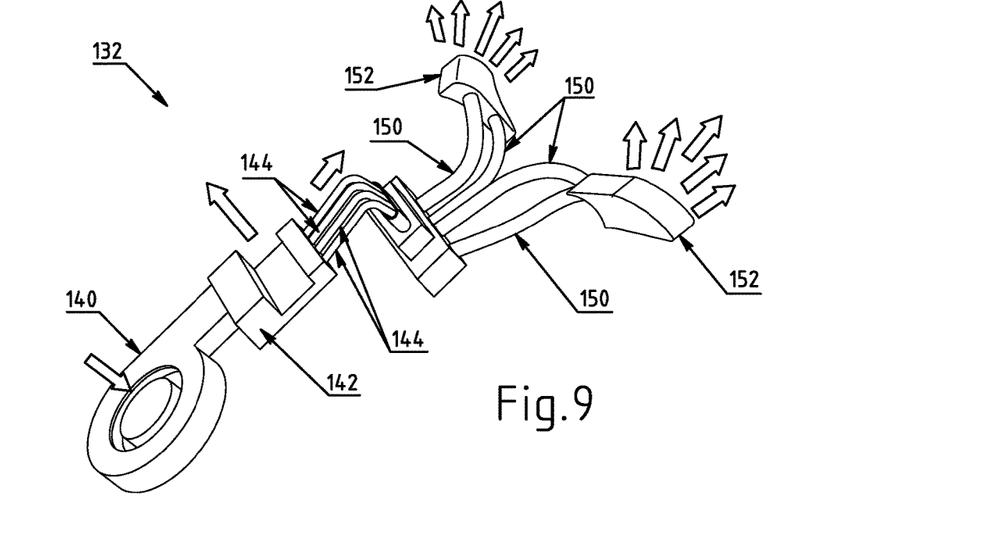
FIG. 9 illustrates a climate control device of the steering device from FIG. 8 in a perspective view.

The air distribution module 132 receives conditioned air from the air conditioning module 130 and directs air to portions of the rim 124 where hands of the driver may be located during operation. More specifically, the air distribution module 132 can direct the conditioned air to exposed palms, fingers, or other areas of the hands. The air distribution module 132 includes an air guidance device 150, vents 152, and a deflector module 154. The air guidance device 150 receives the conditioned air from one or more outlets of the connecting device 134 and provides the conditioned air to inlets of the vents 152. The air guidance device 150 includes channels formed by tubes or other structure integrated with the steering wheel 112. For illustration, the air guidance device 150 includes four tubes of which two tubes connect each of the vents 152 to the connecting device 134 as best seen in FIG. 9. A number of the channels or tubes can vary based on the number of spokes 122, vents 152, number of channels or tubes of the air guidance device 144, and the valve configuration of the connecting device 134. For example, the number of channels or tubes of the air guidance device 150 can be less than, more than, or equal to the number of channels or tubes of the air guidance device 144.

The vents 152 cooperate with the deflector module 154 to direct the conditioned air towards the rim 124. One or more of the vents 152 can be fixed to the central hub 120 and/or the spokes 122 directly or indirectly via the deflector module 154. For illustration, two vents 152 fixed to the deflector module 154 adjacent respective spokes 122 are shown. The vents 152 pass air out towards the deflector module 154 in one or more directions as indicated by the arrows in FIG. 9.

The deflector module 154 deflects conditioned air from the vents 152 in one or more desired directions as indicated by the arrows in FIG. 8. The deflector module 154 can be spaced apart yet fixed to the central hub 120 and or spokes 122 to create gaps, and deflect the conditioned air through the gaps. In a preferred example shown in FIG. 8, the deflector module 154 includes separate t-shaped deflectors 160 fixed to respective spokes 122. The deflectors 160 each include spacer fins 162 that direct the conditioned air.

Figure 10:
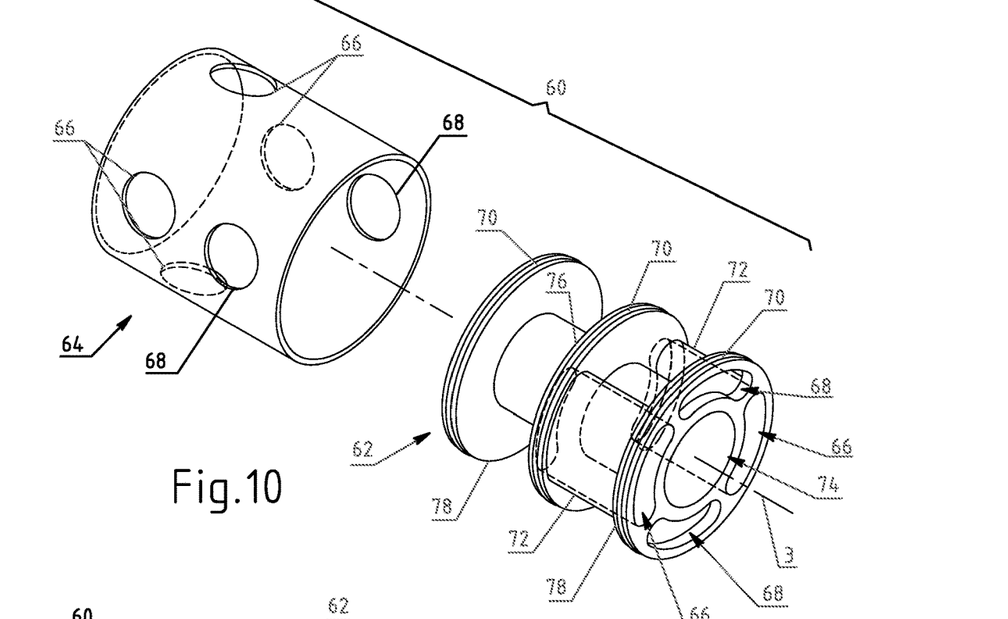
FIG. 10 illustrates an exploded view of a connecting device.

FIG. 10 illustrates a connecting device 60 having a static part 62 and a movable part 64. The movable part 64 is cylindrical and includes a plurality of inlets 66 and a plurality of outlets 68 that connect to air guidance devices (not shown). The movable part 64 extends over and receives the static part 62. The static part 62 as shown includes a pair of inlets 66 that in an alternating arrangement with a pair of outlets 68. The flow paths of the inlets 66 and the outlets 68 are segregated by a dividing wall 76 and the movable part 64. The dividing wall 76 segregates the static part 62 into two halves. The dividing wall 76 and the end walls 78 each include a seal 70 that is in communication with the movable wall 64 so that channels are formed within the connecting device 60. The inlet 66 includes a through channel 72 that extends through and end wall 78 and the dividing wall 76 so that the inlet 66 extends from a first half of the static part 62 to a second half of the static part 62. The outlet 68 extend through an end wall 78 on an opposite end as the inlet 66 and is prevented from passing through the dividing wall 76 so that two discrete air sections are created. However, the connecting device 60 may be free of an outlet 68 or return paths for air to return from an occupant contact region (not shown).

Figure 11:
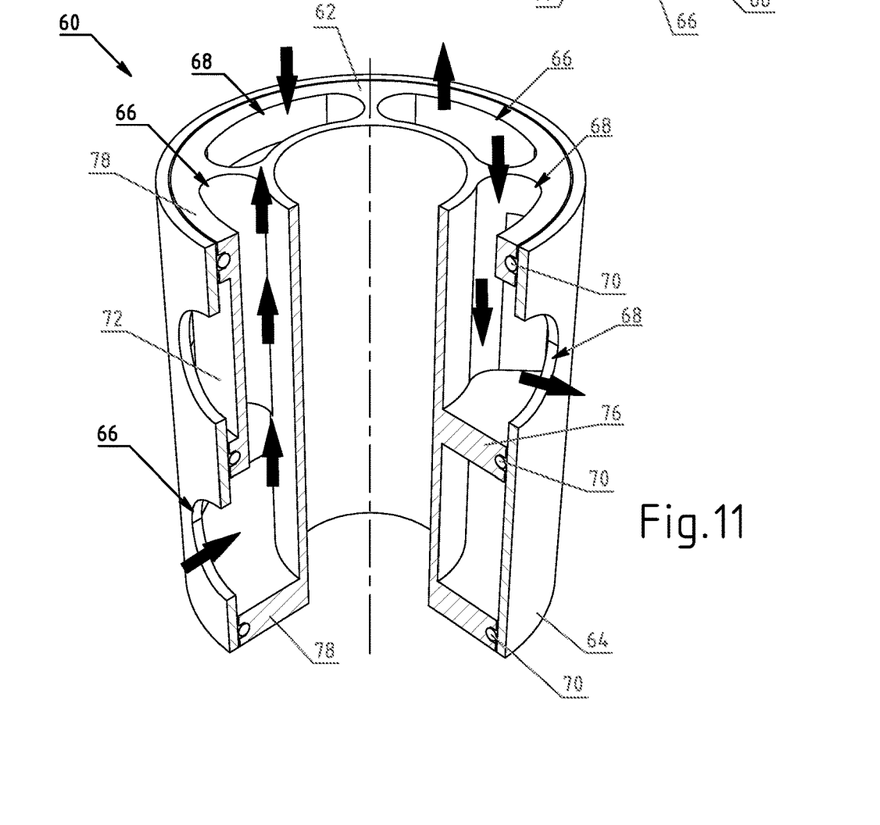
FIG. 11 illustrates a partial section view of the connecting device of FIG. 10.

FIG. 11 illustrates a partial-sectional view demonstrating the various flow paths of air through the connecting device 60. The movable part 64 is extended over the static part 62 so that the seals 70 are in contact with the movable part 64 and channels are formed. The outlet 68 extend through an end wall 78 away from a movable component (not shown) and is directed out of the connecting device 60 through an outlet 68 in the movable part 64. The outlet 68 in the movable part 64 is located proximate to a dividing wall 76 that is sealed to the movable part 64 by a seal 70. The connecting device 60 includes an air inlet 66 in the movable part 64 that is connected to a through channel 72 so that air is directed out of the connecting device 60 through an end wall 78. The through channel 72 passes through the dividing wall 76 of the static part 62 and maintains the inlet flow streams and the outlet flow streams in a discrete relationship.

LIST OF REFERENCES

1 Vehicle
2 Steering device
3 Pivot pole
5 Handle
15 Climate control device
16 Heating device
16a Thermoelectric device
16b Planar heating element
17 Temperature-control device
18 Heating resistor
20 Ventilation device
22, 22', 22''' Air guidance devices
26 Handle distributor
30 Connecting device
31 Supply portion
31' Part (of the connecting device)
32 Receiver portion
32' Part (of the connecting device)
33 Supply channel
34 Collector channel
35 Air outlet
36 Air Inlet
37, 37' Connector channel
38 Rolling element
39 Sealing devices
40, 40' Interface
60 Connecting device
62 Static part
64 Movable part
66 Inlet
68 Outlet
70 Seal
72 Through channel
74 Shaft aperture
76 Dividing wall
78 End wall
100 Steering device
102 Climate controlled device
110 Steering Column
112 Steering Wheel
114 Steering shaft
120 Central hub
122 Spokes
124 Rim
130 Air Conditioning Module
132 Distribution Module
134 Connecting Device
140 Ventilation Device
142 Temperature Control Device
144 Air Guidance Device
150 Air Guidance
152 Vents
154 Deflector Module
160 Deflectors
162 Spacer Fins

The invention claimed is:

1. A climate control device for influencing at least one climatic parameter of a handle of a steering device comprising:
an air moving device configured to be within a static portion of the steering device;
a handle distributor configured to be within at least a part of the handle of a moveable portion of the steering device;
a connecting device fluidly coupling the static portion of the steering device to the moveable portion of the steering device;
a plurality of air guidance devices located on the static portion and the moveable portion of the steering device that fluidly connect the air moving device and the handle distributor through the connecting device; and
at least one thermoelectric device fluidly connected with the air moving device and the handle distributor to heat the handle of the steering device in a heating mode and cool the handle of the steering device in a cooling mode; wherein the plurality of air guidance devices directs a stream of air to and from the static portion of the steering device and the handle distributor through the connecting device without inhibiting the stream of air when the moveable portion of the steering device rotates relative the static portion of the steering device;
wherein the connecting device includes at least two interfaces between the static portion and the moveable portion of the steering device creating two air paths allowing an exchange of at least two air streams between the handle distributor and the connecting device, at least a first air stream being directed toward the handle distributor and at least a second air stream being directed away from the handle distributor
wherein the connecting device is provided with a ring connector channel arranged concentrically in relation toward an axis of a pivot pole.

2. The climate control device according to claim 1, wherein the connecting device allows a rotation of the handle device of at least 180° around the pivot pole of the steering device.

3. The climate control device according to claim 1, wherein at least a first air path is provided for moving the first air stream along a first side of the at least one thermoelectric device, and at least a second air path is provided to moving the second air stream along a second side of the at least one thermoelectric device, the first side and the second side having a different temperature during the heating mode and the cooling mode.

4. A handle, vehicle, or steering mechanism, equipped with at least one climate control device according to claim 1.

5. The climate control device according to claim 1, wherein the steering device is a steering wheel.

6. A climate control device for a steering device comprising:
   a. one or more connecting devices located between and fluidly connecting a static component of the steering device with a movable component of the steering device, the one or more connecting devices including:
      i. a static part;
      ii. a movable part fluidly connected to the static part,
      iii. one or more inlet channels from the static component of the steering device to the movable component of the steering device that guide a fluid towards the moveable component of the steering device from the static component of the steering device; and
      iv. one or more outlet channels from the movable component of the steering device to the static component of the steering device that guide the fluid towards the static component of the steering device from the movable component of the steering device;
   b. one or more air movers located within the static component of the steering device and being in fluid communication with the movable component of the steering device through the one or more connecting devices;
   wherein the movable part of the one or more connecting devices moves with the movable component of the steering device so that the one or more inlet channels and the one or more outlet channels has a static relationship with the movable component as the movable component of the steering device is moved; and
   wherein the one or more air movers simultaneously blows fluid through the one or more inlet channels into the movable component of the steering device and through the one or more outlet channels away from the steering device.

7. The climate control device of claim 6, wherein each of the one or more inlet channels and the one or more outlet channels are discrete from one another.

8. The climate control device of claim 6, wherein the one or more connecting devices includes two discrete halves that are separated by a dividing wall.

9. The climate control device of claim 8, wherein an air guidance device is connected to the one or more inlet channels and the one or more outlet channels for guiding air between the static component of the steering device and the movable component of the steering device.

10. The climate control device of claim 9, wherein one or more seals are located between the static part and the movable part and the one or more seals form a fluid barrier and create a bearing surface of the movable part to move about the static part.

11. The climate control device of claim 10, wherein the connecting device includes one or more end walls and the end walls include one or more of the inlet channels, outlet channels, or both.

12. The climate control device of claim 11, wherein the static component of the steering device is a steering column and the movable component of the steering device is a steering wheel.

13. The climate control device of claim 3, wherein the first air path and the second air path are discrete from one another.

14. The climate control device of claim 13, wherein the connecting device includes two discrete halves that are separated by a dividing wall.

15. The climate control device of claim 14, wherein one or more seals are located between the static part and the movable part and the one or more seals form a fluid barrier and create a bearing surface of the movable part to move about the static part.

16. The climate control device of claim 15, wherein the connecting device includes one or more end walls and the end walls include one or more inlets, one or more outlets, or both.

17. The climate control device of claim 16, wherein the static component is a steering column and the movable component is a steering wheel.

18. The climate control device of claim 6, wherein the movable part extends over and receives the static part of the one or more connecting devices.

* * * * *